June 20, 1939. E. E. HEWITT 2,163,399
LUBRICATING DEVICE FOR VALVE DEVICES
Filed March 21, 1936
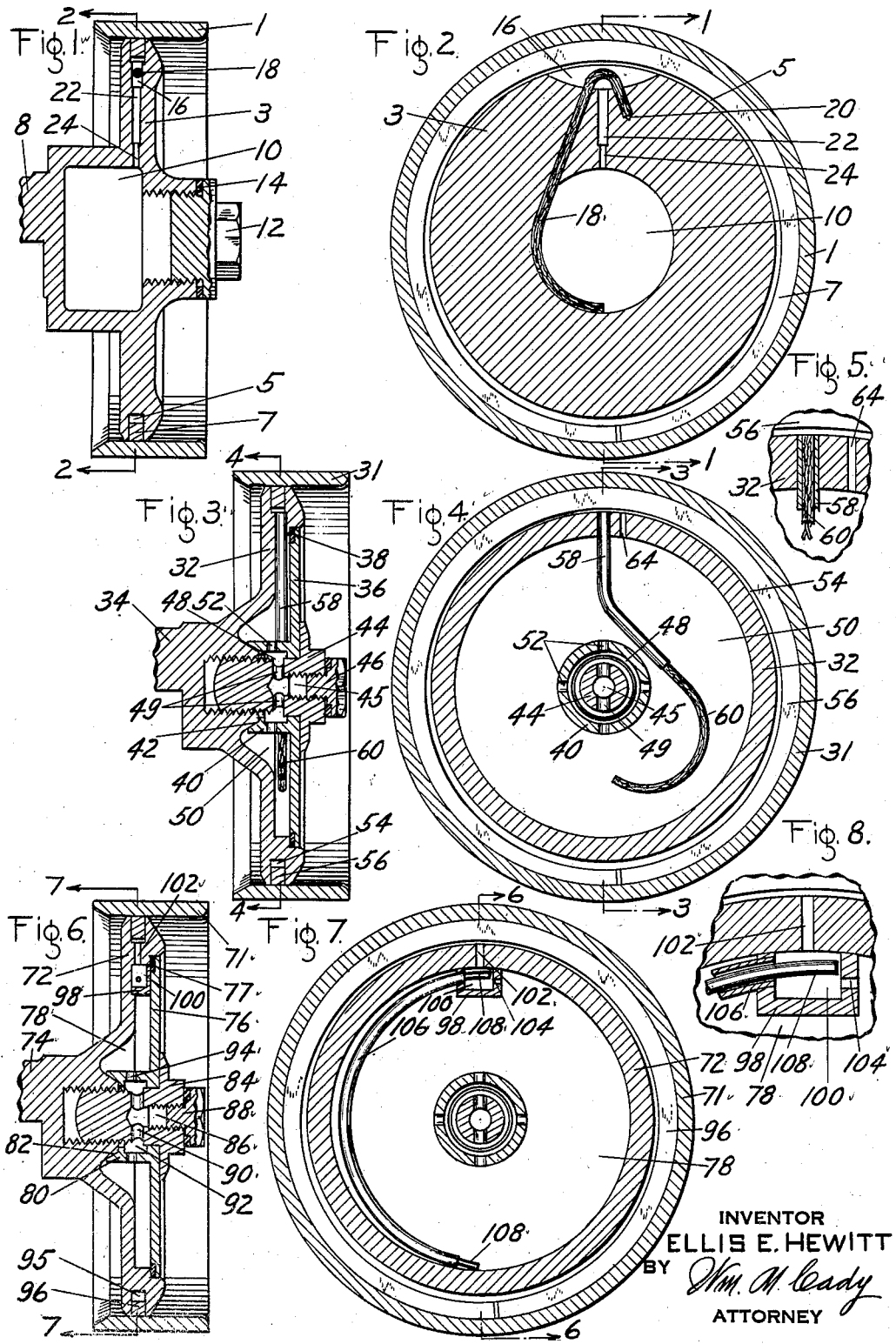
INVENTOR
ELLIS E. HEWITT
BY Wm. M. Cady
ATTORNEY Patented June 20, 1939

2,163,399

UNITED STATES PATENT OFFICE 2,163,399

LUBRICATING DEVICE FOR VALVE DEVICES

Ellis E. Hewitt, Edgewood, Pa., assignor to The Westinghouse Air Brake Company, Wilmerding, Pa., a corporation of Pennsylvania Application March 21, 1936, Serial No. 70,125

19 Claims. (Cl. 184—18)

This invention relates to a brake controlling valve device and more particularly to lubricating means for supplying lubricant to portions of the valve device.

As usually constructed brake controlling valve devices have a body having a bore therein in which is mounted a piston which is provided with a groove in which is mounted a packing ring which is pressed against the face of the bore by the inherent resiliency of the material of which it is constructed. The piston and piston packing ring are reciprocable in the bore in the body in response to variations in the pressure on opposite faces of the piston.

At the time that the brake controlling valve devices are placed in service the face of the bore and the peripheral surface of the piston and packing ring are lightly coated with lubricant in order to reduce the friction present on movement of the piston. It has been found that after a period of service little or no lubricant may remain and, as a result, there will be a substantial increase in the friction developed on movement of the piston and there will be a corresponding increase in the resistance to movement of the piston. Because of this greater resistance to movement of the piston a greater pressure differential must be developed on opposite sides of the piston before it will be moved and, as a result, the responsiveness of the brake controlling valve device to pressure changes is altered.

It is an object of this invention to provide a brake controlling valve device incorporating means to supply lubricant to the peripheral surface of the piston, the piston packing ring and the bore in the body of the valve device at periodic intervals while the valve device is in service.

A further object of the invention is to provide a brake controlling valve device having lubricating means responsive to variations in the pressure of the fluid in portions of the device for supplying lubricant in limited quantities to the portions of the valve device which it is desired to have lubricated.

Another object of the invention is to provide a brake controlling valve device having a piston having a lubricant reservoir associated therewith and having means for supplying lubricant from this reservoir to the portions of the valve device which it is desired to have lubricated.

A further object of the invention is to provide a brake controlling valve device having a piston having a lubricant reservoir formed therein and having means for transferring lubricant by capillary attraction from this reservoir to a region adjacent the uppermost portion of the piston.

Another object of the invention is to provide a brake controlling valve device having a piston having a lubricant reservoir formed therein and having means responsive to the supply and release of fluid under pressure to and from said reservoir for supplying lubricant from the reservoir to the portions of the valve device to be lubricated.

A further object of the invention is to provide an improved brake controlling valve device having means for lubricating portions of the valve device.

Other objects of the invention and features of novelty will be apparent from the following description taken in connection with the accompanying drawing in which Fig. 1 is a fragmentary sectional view of a brake controlling valve device incorporating one form of lubricating means provided by this invention, this view being taken substantially along the line 1—1 of Fig. 2, Fig. 2 is a sectional view taken substantially along the line 2—2 of Fig. 1, Fig. 3 is a fragmentary sectional view of a brake controlling valve device incorporating a different form of lubricating means provided by this invention, this view being taken substantially along the line 3—3 of Fig. 4, Fig. 4 is a sectional view taken substantially along the line 4—4 of Fig. 3, Fig. 5 is an enlarged sectional view of a portion of the valve device shown in Figs. 3 and 4, Fig. 6 is a fragmentary sectional view of a brake controlling valve device incorporating another form of lubricating means provided by this invention, this view being taken substantially along the line 6—6 of Fig. 7, Fig. 7 is a sectional view taken substantially along the line 7—7 of Fig. 6, and Fig. 8 is an enlarged sectional view of a portion of the valve device shown in Figs. 6 and 7.

Referring to the drawing there is illustrated in Fig. 1 a bushing 1 which may be formed of any suitable material, such as brass or molded plastic composition, and is adapted to be pressed into a bore in the body, not shown, of a brake controlling valve device.

The bushing 1 has a bore therein in which is mounted a piston 3 which may be formed of any suitable material, such as brass, and has a groove 5 formed in the periphery thereof in which is mounted a packing ring 7, which may be constructed of a suitable material, such as brass, and which is pressed outwardly by the inherent resiliency of the material of which it is constructed into firm engagement with the inner face of the bushing 1.

The piston 3 has a stem 8 formed integral therewith and adapted to operate valve means, not shown. The piston 3 also has a chamber 10 formed centrally thereof, while a threaded opening in the wall of the chamber 10 is closed by means of a plug 12 which carries an annular gasket 14.

As is best shown in Fig. 2 of the drawing, the piston 3 has a cavity 16 cut therein adjacent the uppermost portion of the piston and this cavity is open to the base of the ring groove 5.

The piston 3 has an angular passage formed therein in which is mounted a wick 18 which is adapted to transfer by capillary attraction lubricant from the lubricant chamber 10 to the cavity 16. The wick 18 may be of any suitable construction, and may be in the form of metallic wires twisted together and having bound therebetween fibers of suitable material, such as cotton or wool. The lower end of the wick 18 extends substantially to the bottom of the lubricant chamber 10, while the upper end of the wick 18, which is in the cavity 16, is bent back upon itself and extends into a blind hole 20 which opens on the bottom wall of the cavity 16.

The curved portion of the wick 18 in the cavity 16 is preferably located adjacent to but spaced from the lower face of the piston packing ring 7.

The wick 18 and the passage through which it extends are proportioned so that the wick fits this passage closely enough to prevent a rapid flow of fluid from the lubricant chamber 10 to the cavity 16, but not so closely as to completely cut off this flow of fluid.

The piston 3 also has formed therein a breather passage 22 having a restricted portion 24 therein. The breather passage 22 extends from the base of the cavity 16 to the upper portion of the lubricant chamber 10 and is arranged so as to direct the flow of fluid from the lubricant chamber 10 to the cavity 16 over the curved portion of the wick 18.

In operation the threaded plug 12 is removed and a quantity of lubricant sufficient to partially fill the lubricant chamber 10 is placed in this chamber and the threaded plug 12 is then replaced and is tightened so as to firmly compress the sealing gasket 14.

When the valve device is placed in service the pressure of the fluid on a face of the piston 3 will be increased and fluid will flow at a slow rate past the periphery of the piston 3 and between the packing ring 7 and the walls of the groove in which the packing ring is mounted to the open space at the base of the ring groove. From this space the fluid under pressure will flow to the cavity 16 and therefrom by way of the breather passage 22 and the restricted portion 24 thereof to the lubricant chamber 10 and will increase the pressure of the fluid in this chamber.

The lubricant which is present in the chamber 10 will saturate the wick 18 and will be carried thereby by capillary attraction upwardly to the cavity 16 so as to saturate the portion of the wick 18 in the cavity 16. Some lubricant may flow from this portion of the wick to the bottom wall of the cavity 16 and it will flow across this wall by gravity to the breather passage 22 and will coat the wall of this passage with lubricant. If there is an excess of lubricant it may flow through the breather passage 22 to the lubricant chamber 10.

On a reduction in the pressure of the fluid on the face of the piston 3, fluid under pressure will flow from the lubricant chamber 10 through the breather passage 22 to the cavity 16 and to the ring groove 5 and thence past the ring 7 and past the periphery of the piston 3 to a chamber on the face of the piston.

The fluid which flows from the lubricant chamber 10 through the breather passage 22 is directed across the curved portion of the wick 18 which is in the cavity 16 and in passing over this portion of the wick 18 it will pick up small particles of lubricant which will be blown against the piston packing ring 7.

In addition, the fluid passing through the breather passage 22 will pick up a portion of the lubricant deposited on the walls of this passage and also on the bottom wall of the cavity 16 at the point at which the passage 22 opens on the cavity 16. This lubricant will also be carried to the piston packing ring 7.

In addition, at this time some fluid will flow from the lubricant chamber 10 through the passage in which the wick 18 is mounted, and in passing over this wick, which is saturated with lubricant, the fluid will pick up small particles of lubricant and these will also be carried to the piston packing ring 7.

The piston packing ring 7 closely fits the ring groove 5 in the periphery of the piston 3 and lubricant which is deposited thereon will flow by capillary attraction through the small space between the packing ring and the walls of the ring groove to the outer face of the packing ring, and will also flow around the piston 3 so as to supply lubricant throughout the entire circumference of the piston. When the piston 3 is reciprocated in the bore of the bushing 1 this lubricant will be distributed across the face of the bore and also across the face of the piston and the piston packing ring.

On a subsequent increase in the pressure of the fluid on the face of the piston 3, fluid will flow to the lubricant chamber 10, as explained in detail above, to restore the pressure of fluid in this chamber so that on the next reduction in the pressure of the fluid on the face of the piston 3 fluid will flow from the lubricant chamber 10 and will cause lubricant to be carried from this chamber to the piston packing ring 7 to lubricate the portions of the valve device to be lubricated.

It will be seen that this lubricating means provides means responsive to operation of the valve device for supplying a limited quantity of lubricant to the portions of the valve device which are to be lubricated. It will be seen that the amount of lubricant which is supplied is regulated by the amount of lubricant which will be carried by capillary attraction over the wick 18 from the lubricant chamber 10 to the cavity 16. It will be seen also that the breather passage 22 limits the flow of fluid through the passage in which the wick 18 is located so as to prevent fluid flowing over the wick from transferring too great an amount of lubricant from the lubricant chamber 10 to the cavity 16. This prevents excessive lubrication of the valve device.

In Figs. 3, 4 and 5 of the drawing, there is illustrated another form of lubricating means embodying this invention. As shown in these figures of the drawing there is a piston bushing 31 having a bore therein in which is mounted a piston 32 which is reciprocable in response to variations in the pressure of the fluid on opposite sides thereof. The piston 32 has a stem 34 formed integral therewith and which operates valve means, not shown.

The piston 32 has a cavity formed in the face thereof which is closed by means of a cover 36 and an annular sealing gasket 38. The cover 36 is provided with a cylindrical central portion 40 which is adapted to engage a conical shoulder 42 on the stem 34. A threaded member 44 is provided to hold the cover 36 in place and this threaded member extends into a threaded opening in the stem 34.

The threaded member 44 is provided with a threaded opening 45 in which is secured a threaded plug 46. The opening 45 communicates with a chamber 48 within the cylindrical portion 40 by way of ports 49, while the chamber 48 within the cylindrical portion 40 communicates with the chamber 50 outwardly thereof through ports 52.

The piston 32 has a groove 54 formed in the periphery thereof in which is mounted a piston packing ring 56. The piston 32 has an opening formed therein substantially at the uppermost portion of the piston and extending between the base of the ring groove 54 and the chamber 50. A tube 58 is secured in this opening, and, as is best shown in Fig. 4 of the drawing, this tube extends substantially to the central portion of the chamber 50 and is curved so as to extend at one side of the cylindrical portion 40 of the cover 36.

A wick 60 is positioned in the passage in the tube 58 and extends from substantially the face of the ring groove to a point adjacent the bottom of the chamber 50.

The wick 60 may be of any suitable construction, but in the preferred form it is constructed of a pair of wires twisted together and having fibrous material, such as wool or cotton, held therebetween.

The wick 60 is of such size as to closely fit the passage through the tube 58 so that the wick is held in position in the tube 58 by friction between the fibrous material of the wick and the interior wall of the tube 58, and so that the resistance to the flow of fluid through the tube 58 is great enough to prevent a substantial flow of fluid through the tubular member.

The piston 32, in addition, has a breather passage 64 formed therein and extending from the base of the ring groove at a point adjacent the upper portion of the piston to the chamber 50 at a point adjacent the upper portion of the chamber.

In operation, the plug 46 is removed and lubricant is supplied to the passage 45 from which it flows through the ports 49 to the chamber 48 and thence by way of the ports 52 to the lubricant chamber 50. Sufficient lubricant is supplied to partially fill the lubricant chamber 50. The threaded plug 46 is then replaced and is tightened so as to seal the opening in which it is mounted.

The lubricant which is supplied to the lubricant chamber 50 saturates the wick 60 and the lubricant flows from the lower portion of the wick 60 to the upper portions thereof in the passage in the tube 58 by capillary attraction.

As a result of this capillary action lubricant will be carried to the base of the ring groove 54 substantially at the uppermost portion thereof and it will flow by gravity around the ring groove.

The lubricant which is supplied to the ring groove will reach the piston packing ring 56 and it will flow by capillary action through the relatively small space between the piston packing ring and the sides of the ring groove 54 so as to reach the external face of the piston packing ring 56 and the piston 32. On movement of the piston 32 in the bore in the bushing 1, the lubricant will be distributed across the face of the piston, the piston packing ring and the face of the bore.

When the valve device is in service fluid under pressure is present on a face of the piston 32 and it will flow past the periphery of the piston and past the piston packing ring 56 to the base of the ring groove 54. From the ring groove 54 the fluid will flow through the breather passage 64 to the lubricant chamber 50 and will increase the pressure of the fluid in this chamber.

On a reduction in the pressure of the fluid on the face of the piston 32 fluid will flow from the lubricant chamber through the breather passage 64 to the base of the ring groove 54 and thence past the piston packing ring 56 and past the periphery of the piston 3. In addition some fluid will flow from the chamber 50 through the passage in the tube 58 and in passing over the wick 60, which is saturated with lubricant, will pick up a small amount of lubricant which will be carried to the piston packing ring 56.

The amount of flow of fluid through the passage in the tube 58 will be limited, however, because of the resistance to the flow of fluid through this passage offered by the wick 60, which closely fits the passage in the tube 58, and because fluid may flow from the lubricant chamber 50 to the base of the ring groove through the breather passage 64.

This arrangement prevents too great a flow of fluid through the tube 58 in which the wick 60 is mounted, which would result in too rapid flow of lubricant from the lubricant chamber 50 to the piston packing ring 56 and would produce over lubrication of the valve device.

On the subsequent increase in the pressure of the fluid on the face of the piston 32 fluid flows past the periphery of the piston 32 and packing ring 56 to the base of the ring groove 54, and therefrom through the breather passage 64 to the lubricant chamber 50 to restore the pressure of the fluid in the lubricant chamber 50.

In Figs. 6, 7 and 8 of the drawing there is illustrated still another form of lubricating means provided by this invention. In the brake controlling valve device shown in these figures of the drawing there is a piston bushing 71 having a bore therein in which is mounted a piston 72, which is similar to the piston 32 employed in the valve device shown in Fig. 3 of the drawing. The piston 72 has a stem 74 formed integral therewith and adapted to operate valve mechanism, not shown. The piston 72 has a recess in a face thereof which is closed by means of a cover 76 and a gasket 77 which cooperate with the piston 72 to form a chamber 78 adapted to contain a quantity of lubricant.

The cover 76 has a cylindrical central portion 80 which is adapted to engage a shoulder 82 on the end of the stem 74. The cover 76 is held in position by means of a threaded member 84 which extends into a threaded opening in the end of the stem 74.

The threaded member 84 has a passage 86 formed therein in which is secured a threaded plug 88. The passage 86 communicates by way of ports 90 with a chamber 92 within the cylindrical portion 80 of the cover 76, while the chamber 92 communicates by way of ports 94 with the lubricant chamber 78.

The piston 72 has a groove 95 cut in the periphery thereof and a packing ring 96 is mounted in this groove.

A hollow member indicated at 98 is secured in a recess in the face of the piston 72 adjacent the uppermost portion of the lubricant chamber 78 and this member is held in position by means of the cover 76. The member 98 has a mixing chamber 100 formed therein, and this mixing chamber communicates by way of a port 102 with the base of the ring groove 95 adjacent the uppermost portion of the ring groove.

The mixing chamber 100 also communicates by way of a port 104 with the lubricant chamber 78 adjacent the upper portion of the lubricant chamber.

The wall of the member 98 has an opening therein substantially opposite the port 104 in which is secured a tube 106. The tube 106 is curved and extends around the periphery of the lubricant chamber 78 to a point adjacent the lower portion of this chamber.

The curved tube 106 has a wire 108 positioned therein and the wire 108 is proportioned so as to loosely fit in the passage through the tube 106. The lower end of the wire 108 projects from the lower end of the tube 106 a short distance, while the upper end of the wire 108 projects into the mixing chamber 100 and extends across this chamber, as is clearly shown in Fig. 8 of the drawing, so as to be in the path of fluid flowing from the port 104 to the port 102.

In operation the threaded plug 88 is removed and lubricant is supplied to the passage 86 from which it flows through the ports 90 to the chamber 92 and thence by way of the ports 94 to the lubricant chamber 78. A quantity of lubricant sufficient to partially fill the lubricant chamber 78 is supplied to this chamber through the passage 86. The plug 88 is then replaced and is tightened so as to close the opening in which it is mounted.

The lubricant which is present in the lubricant chamber 78 flows into the lower portion of the passage in the tube 106, and as the wire 108 loosely fits the passage in the tube 106 there will be a small space between the wire and the interior wall of the tube 106 and lubricant will flow upwardly in the passage in the tube 106 by capillary attraction.

Lubricant, therefore, will be carried through the tube 106 to the mixing chamber 100 and the end of the wire 108 which projects into this chamber will be coated with lubricant.

During operation of this brake controlling valve device fluid under pressure will be present on a face of the piston and it will flow past the periphery of the piston and past the piston packing ring 96 to the base of the ring groove 95 and will flow therefrom through the port 102 to the mixing chamber 100 and thence by way of the port 104 to the lubricant chamber 78. As fluid may flow from the mixing chamber 100 to the lubricant chamber 78 through the passage 104 it will not tend to flow from the mixing chamber 100 through the passage through the tube 106 and thereby force the lubricant in this passage away from the mixing chamber 100.

On a reduction in the pressure of the fluid on the face of the piston 72 fluid will flow from the lubricant chamber 78 through the port 104 to the mixing chamber 100 and will pass across the end of the wire 108 and thence to the passage 102 leading to the base of the ring groove 95. As this fluid passes over the end of the wire 108, which is coated with lubricant, it will pick up a small amount of lubricant and will carry this lubricant through the passage 102 to the ring groove 95.

Fluid which flows from the lubricant chamber to the ring groove 95 flows around the periphery of the piston between the ring and the base of the ring groove, while this fluid flows from the ring groove past the ring 96 and past the periphery of the piston 3, thereby depositing lubricant on the packing ring 96 and on the piston. In addition, lubricant carried to the piston packing ring 96 will flow by capillary action through the relatively small spaces between the packing ring and the sides of the ring groove and will reach the periphery of the piston 72. On movement of the piston 72 in the bore in the bushing 71 the lubricant on the piston and on the packing ring will be distributed across the face of the piston and the piston packing ring and also across the face of the bore in the bushing 71.

On the subsequent increase in the pressure of the fluid on the face of the piston 72 fluid will flow to the lubricant chamber 78 in the manner described above to restore the pressure of the fluid in this chamber.

It will be seen that this lubricating means operates to supply a limited quantity of lubricant to the piston and piston packing ring in response to operation of the valve device. The amount of lubricant which is supplied, however, is limited so as to prevent over or excessive lubrication of the valve device.

While several forms of lubricating means provided by my invention have been illustrated and described in detail, it should be understood that the invention is not limited to these details of construction and that numerous modifications and changes may be made without departing from the scope of the following claims.

Having now described my invention, what I claim as new and desire to secure by Letters Patent, is:

1. In a brake controlling valve device, a body having a bore therein, a piston reciprocable in said bore, a chamber associated with the piston and adapted to contain a quantity of free lubricant in liquid form, and means for transferring lubricant from said chamber to a region adjacent the periphery of the piston, said means providing the sole communication from said chamber and being arranged so that lubricant cannot flow from said chamber by force of gravity alone.

2. In a brake controlling valve device, a body having a bore therein, a piston reciprocable in said bore in a substantially horizontal plane, a chamber associated with the piston and adapted to contain a quantity of free lubricant in liquid form, and means for transferring lubricant from said chamber to a region adjacent the periphery of the piston located adjacent the uppermost part of the piston, said chamber and said means being arranged so that lubricant cannot flow from said chamber by force of gravity alone.

3. In a brake controlling valve device, a body having a bore therein, a piston reciprocable in said bore, the piston having a groove therein, a packing ring mounted in said groove, a chamber associated with said piston and adapted to contain a quantity of free lubricant in liquid form, and means for transferring lubricant from said chamber to a region in the base of the ring groove, said means providing the sole communication from said chamber and being arranged so that lubricant cannot flow from said chamber by force of gravity alone.

4. In a brake controlling valve device, a body having a bore therein, a piston reciprocable in said bore in a substantially horizontal plane, the piston having a groove therein, a packing ring mounted in said groove, a chamber associated with said piston and adapted to contain a quantity of free lubricant in liquid form, and means for transferring lubricant from said chamber to a region in the base of the ring groove located adjacent the uppermost portion of the said ring groove, said chamber and said means being arranged so that lubricant cannot flow from said chamber by force of gravity alone.

5. In a brake controlling valve device, a body having a bore therein, a piston reciprocable in said bore, a chamber associated with said piston and adapted to contain a quantity of free lubricant in liquid form, and means for transferring lubricant by capillary attraction from said chamber to a region adjacent the periphery of the piston, said chamber and said means being arranged so that lubricant cannot flow from said chamber by force of gravity alone.

6. In a brake controlling valve device, in combination, a body having a bore therein, a piston reciprocable in said bore, the piston having a groove therein, a packing ring mounted in said groove, a chamber associated with said piston and adapted to contain a quantity of free lubricant in liquid form, and means for transferring lubricant by capillary attraction from said chamber to a region in the base of the ring groove, said chamber and said means being arranged so that lubricant cannot flow from said chamber by force of gravity alone.

7. In a brake controlling valve device, in combination, a body having a bore therein, a piston reciprocable in said bore in a substantially horizontal plane, the piston having a groove therein, a packing ring mounted in said groove, the piston having a chamber located substantially centrally thereof, said chamber being adapted to contain a quantity of free lubricant in liquid form, and a passage communicating with said chamber adjacent the uppermost portion thereof and with a region in the base of the ring groove located adjacent the uppermost portion of the ring groove, said passage forming the sole communication from said chamber whereby lubricant cannot flow from said chamber by gravity alone.

8. In a brake controlling valve device, in combination, a body having a bore therein, a piston reciprocable in said bore, the piston having a chamber associated therewith and adapted to contain a quantity of free lubricant in liquid form, a passage communicating with the chamber and with a region adjacent the peripheral portion of the piston, means positioned in said passage and adapted to transfer lubricant by capillary attraction from the chamber to the peripheral portion of the piston, and another passage communicating with said chamber and with a region adjacent the peripheral portion of the piston, said chamber and said passages being arranged so that lubricant cannot flow from said chamber by gravity alone.

9. In a brake controlling valve device, in combination, a body having a bore therein, a piston reciprocable in said bore in a substantially horizontal plane, the piston having a chamber associated therewith and adapted to contain a quantity of free lubricant in liquid form, a passage communicating with said lubricant chamber and with a region adjacent the peripheral portion of the piston adjacent the uppermost portion thereof, means positioned in said passage and adapted to transfer lubricant by capillary attraction from the lower portions of the lubricant chamber to the peripheral portion of the piston, and another passage communicating with said chamber and with a region adjacent the peripheral portion of the piston, said chamber and said passages being arranged so that lubricant cannot flow from said chamber by gravity alone.

10. In a brake controlling valve device, in combination, a body having a bore therein, a piston reciprocable in said bore in a substantially horizontal plane, the piston having a groove therein, a packing ring mounted in said groove, the piston having a chamber associated therewith and adapted to contain a quantity of free lubricant in liquid form, a passage communicating with the lubricant chamber and with the base of the ring groove in a region adjacent the uppermost portion of the piston, means positioned in said passage for transferring lubricant by capillary attraction from the chamber to the ring groove, and another passage communicating with said chamber and with the base of the ring groove, said chamber and said passages being arranged so that lubricant cannot flow from said chamber by gravity alone.

11. In a brake controlling valve device, in combination, a body having a bore therein, a piston reciprocable in said bore, the piston having a chamber associated therewith and adapted to contain a quantity of lubricant, the piston having a groove formed therein, a packing ring positioned in said groove, the piston having a cavity formed therein substantially at the uppermost portion thereof, said cavity being open to the base of the ring groove, a passage communicating with said cavity and with the lubricant chamber adjacent the uppermost portion thereof, another passage communicating with the cavity and with the lubricant chamber, and means positioned in said other passage for transferring the lubricant by capillary attraction from the lubricant chamber to said cavity, said means extending across the path of fluid flowing from the lubricant chamber to the cavity through said first named passage.

12. In a brake controlling valve device, in combination, a body having a bore therein, a piston reciprocable in said bore in a substantially horizontal plane, the piston having a chamber associated therewith and adapted to contain a quantity of free lubricant in liquid form, a passage communicating with said lubricant chamber and with a region adjacent the periphery of the piston substantially at the uppermost portion thereof, a wick positioned in said passage and adapted to transfer lubricant by capillary attraction from the lubricant chamber to the region adjacent the periphery of the piston, the wick and the passage being proportioned so as to permit fluid to flow through said passage, and a breather passage communicating with the lubricant chamber and with the region with which the first named passage communicates, said chamber and said passages being arranged so that lubricant cannot flow from said chamber by gravity alone.

13. In a brake controlling valve device, in combination, a body having a bore therein, a piston reciprocable in said bore, the piston having a chamber associated therewith and adapted to contain a quantity of lubricant, a mixing chamber associated with the piston, a passage communicating with the mixing chamber and with a region adjacent the periphery of the piston, a tube having a passage therein communicating with the mixing chamber and with the lubricant chamber adjacent the lowermost portion thereof, a wire loosely mounted in said tube, the wire extending into the mixing chamber, and a communication between said mixing chamber and the upper portion of the lubricant chamber.

14. In a brake controlling valve device, in combination, a body having a bore therein, the axis of the bore extending in a substantially horizontal plane, a piston reciprocable in said bore and being provided with a chamber adapted to contain a quantity of free lubricant in liquid form, a passage between said chamber and a point adjacent the periphery of the piston only adjacent the uppermost portion of the piston, and means mounted in said passage for transferring lubricant by capillary attraction from said chamber to the peripheral portion of the piston.

15. In a brake controlling valve device, in combination, a body having a bore therein, the axis of the bore extending in a substantially horizontal plane, a piston reciprocable in said bore and being provided with a chamber adapted to contain a quantity of free lubricant in liquid form, a passage between said chamber and a point adjacent the periphery of the piston only adjacent the uppermost portion of the piston, means mounted in said passage for transferring lubricant by capillary attraction from said chamber to the peripheral portion of the piston, and a breather passage extending between the upper portion of said lubricant chamber and the peripheral portion of said piston.

16. In a brake valve, the combination of a piston subject on at least one side to variations of air pressure; a reservoir for liquid lubricant in said piston; an absorbent body in said reservoir exposed above the level of lubricant, and adapted to be saturated with liquid lubricant; and means forming a surge port leading from a point in said reservoir above the level of lubricant therein to a point on the periphery of the piston exposed to said pressure variations.

17. In a brake valve, the combination of a piston subject on at least one side to variations of air pressure; a reservoir for liquid lubricant in said piston; an absorbent body in said reservoir exposed above the level of lubricant and adapted to be saturated with lubricant; a piston ring mounted in a groove in the periphery of the piston; and means forming a surge port leading from a point in said reservoir above the level of lubricant therein, to said ring groove and to the periphery of said piston.

18. In a brake valve, the combination of a piston subject on at least one side to variations of air pressure; a reservoir for liquid lubricant in said piston; an absorbent body in said reservoir exposed above the level of lubricant and adapted to be saturated with lubricant; a piston ring mounted in a groove in the periphery of the piston; and means forming a surge port leading from a point in said reservoir above the level of lubricant therein, to said groove.

19. In a brake valve, the combination of a piston subject on at least one side to variations of air pressure; a reservoir for liquid lubricant in said piston; and means forming a surge port, leading from a point in said reservoir above the level of lubricant therein, to a point in the periphery of the piston exposed to said pressure variations, said surge port serving as the sole communication through which pressure variations are communicated to said reservoir.

ELLIS E. HEWITT.